(12) United States Patent
Chisum et al.

(10) Patent No.: US 8,443,673 B2
(45) Date of Patent: May 21, 2013

(54) HIGH SENSITIVITY GEOPHONE

(75) Inventors: Brad Chisum, San Diego, CA (US);
Mark Fralick, San Diego, CA (US);
Richard Waters, San Diego, CA (US)

(73) Assignee: Lumedyne Technologies Incorporated, San Diego, CA (US)

( * ) Notice: Subject to any disclaimer, the term of this patent is extended or adjusted under 35 U.S.C. 154(b) by 673 days.

(21) Appl. No.: 12/534,538

(22) Filed: Aug. 3, 2009

(65) Prior Publication Data

US 2011/0023614 A1    Feb. 3, 2011

(51) Int. Cl.
*G01H 11/02* (2006.01)

(52) U.S. Cl.
USPC .......................................... 73/649

(58) Field of Classification Search
USPC .......................................... 73/649
See application file for complete search history.

(56) References Cited

U.S. PATENT DOCUMENTS

| | | | | |
|---|---|---|---|---|
| 3,251,028 A | * | 5/1966 | Haggard | 367/183 |
| 3,412,376 A | * | 11/1968 | Johnson, III | 367/182 |
| 3,582,874 A | | 6/1971 | Fedoseenko | |
| 3,593,258 A | * | 7/1971 | Slavens | 367/182 |
| 3,878,504 A | | 4/1975 | Sears | |
| 4,412,317 A | | 10/1983 | Asjes et al. | |
| 5,193,391 A | * | 3/1993 | Cage | 73/504.15 |
| 6,570,824 B1 | | 5/2003 | Born | |
| 7,501,726 B1 | | 3/2009 | Waters et al. | |
| 7,692,340 B2 | | 4/2010 | Waters et al. | |
| 7,869,001 B2 | * | 1/2011 | Makarovic | 355/72 |
| 2003/0155827 A1 | | 8/2003 | Cheung et al. | |
| 2008/0074083 A1 | | 3/2008 | Yarger et al. | |
| 2008/0246346 A1 | * | 10/2008 | Harris et al. | 310/12 |

FOREIGN PATENT DOCUMENTS

| | | |
|---|---|---|
| GB | 2 439 411 | 12/2007 |
| GB | 2 456 313 | 7/2009 |
| GB | 2456313 A * | 7/2009 |
| WO | PCT/US09/36394 | 3/2009 |

* cited by examiner

*Primary Examiner* — Hezron E Williams
*Assistant Examiner* — Mark A Shabman
(74) *Attorney, Agent, or Firm* — Ropes & Gray LLP

(57) ABSTRACT

A geophone including a plurality of ferromagnetic masses (e.g., magnets) disposed to oscillate on one or more compliant elements (e.g., springs) in a manner that produces a steep flux gradient at one or more conductive coils is disclosed. The magnetic masses are positioned with like poles facing each other so as to compress the magnetic field gradient. The coils may be positioned in the flux gap either between the magnets, in close proximity to the magnets, or surrounding the magnets. Vibration measurements may then be detected from the movement of at least one of the magnetic masses.

11 Claims, 8 Drawing Sheets

US 8,443,673 B2

HIGH SENSITIVITY GEOPHONE

BACKGROUND OF THE INVENTION

This invention relates generally to geophones, and more particularly to a high-sensitivity geophone with an improved signal-to-noise ratio.

A geophone is an instrument used to transform seismic energy or vibrations into a voltage signal. A conventional geophone includes a single coil and a ferromagnetic mass (e.g., a magnet), both of which may be contained in a housing. Springs may support the coil, thus allowing motion in one dimension relative to the housing. The magnet may be fixed with respect to the housing and, as the geophone is vibrated, the coil may move relative to the magnet. The relative motion of the coil may induce an electromotive force, or voltage, in the coil. A "single-coil" may include a single, continuous length of wire has been wound into a coil, and that connection to the coil is available at the two ends, or terminals, of the wire. The voltage across these two terminals may provide the output signal from the device. This voltage may be proportional to the velocity of the housing for frequencies above the natural resonant frequency of the spring-coil-mass system.

One of the drawbacks encountered with the above-referenced design is the inability to increase the sensitivity of the geophone without dramatically increasing the size of the geophone (e.g., the length of the coil and/or the size of the ferromagnetic masses). Increasing the size of the geophone generally leads to decreased portability and increased operating costs. Therefore, it would be desirable to provide a more sensitive geophone with a higher signal-to-noise ratio.

SUMMARY OF THE INVENTION

In accordance with an exemplary embodiment of the present invention, systems and methods for measuring vibration using a geophone are provided. The geophone configuration includes a substrate with one or more integral compliant regions (e.g., springs), at least two ferromagnetic masses (e.g., magnets) positioned with like magnetic poles facing each other so as to compress the magnetic field gradient, and a coil. One or more of the ferromagnetic masses may be coupled to a corresponding one or more of the integral compliant regions such that at least one of the ferromagnetic masses moves with respect to the substrate responsive to substrate acceleration. The facing or aligned inner magnetic poles of at least two of the ferromagnetic masses may form a steep magnetic flux gradient region in and around the flux gap. The coil may be coupled to the substrate and disposed within the steep flux gradient region where it is exposed to a changing magnetic flux arising from motion of at least one of the ferromagnetic masses with respect to the substrate. In various exemplary embodiments, the coil may be positioned in the flux gap either between the magnets, in close proximity to the magnets, or surrounding the magnets.

The compressed magnetic field gradient created by facing at least two like magnetic poles together may allow for a greater voltage signal to be generated between the two terminals of the coil for a given vibration amount because the coil may experience a greater change in magnetic flux over a shorter distance. This configuration may result in a greater voltage signal without increasing the noise, thus advantageously resulting in a greater signal-to-noise ratio than a conventional geophone configuration.

In some embodiments, the geophone configuration of the present invention may be used for vibration measurements, including machine monitoring, seismic imaging, and other applications requiring vibration measurements. The coil terminals may be connected to one or more output devices configured to provide a visual, audible, or recorded output indicative of the measured vibration.

In an alternate embodiment of the geophone described above, at least two of the ferromagnetic masses may be rigidly coupled to one another and disposed to move synchronously.

In another alternate embodiment of the geophone described above, two or more of the coupled ferromagnetic masses may be configured to move linearly with respect to the substrate responsive to substrate acceleration.

In another alternate embodiment of the geophone described above, conductors may be coupled to the coil for conducting electrical current flowing in response to the changing magnetic flux.

In another alternate embodiment of the geophone described above, the single coil may be replaced with a plurality of independent coils coupled to the substrate and disposed within the steep flux gradient region where the plurality of independent coils are exposed to the changing magnetic flux. The coils may be connected in series or parallel.

In another alternate embodiment of the geophone described above, the coil may be disposed within the steep flux gradient region within the flux gap.

In another alternate embodiment of the geophone described above, the coil may be disposed within the steep flux gradient region outside or near the flux gap.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
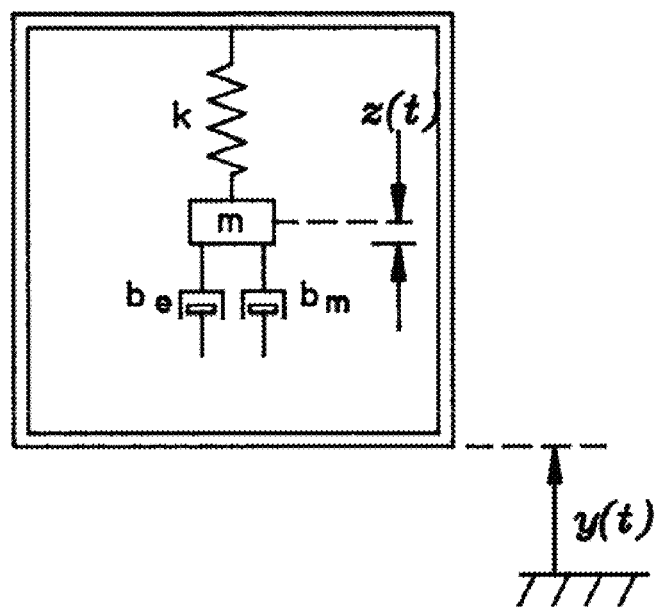
FIG. 1 is a schematic diagram illustrating a damped mass-spring model representative of an exemplary embodiment of the geophone of the present invention.

FIG. 1 is a schematic diagram illustrating a damped mass-spring model representative of an exemplary embodiment of the geophone of this invention. Both electrical and mechanical damping may be considered in analyzing and optimizing the design for particular ambient vibration spectra. Referring to FIG. 1, for time t, a mass m, a spring constant k, an electrical damping factor $b_e$, a mechanical damping factor $b_m$, and a displacement function $z(t)$, the power P available from the coil current may be expressed as shown in Eqn. 1:

$$P = \int_0^v F dv = \int_0^v b_e \dot{z} dv = b_e \int_0^v v dv = \frac{1}{2} b_e v^2 = \frac{1}{2} b_e \dot{z}^2 \quad \text{[Eqn. 1]}$$

Conservation of energy leads to Eqn. 2:

$$m\ddot{z} + (b_e + b_m)\dot{z} + kz = -m\ddot{y} \quad \text{[Eqn. 2]}$$

Laplacian transformation and the substitution of variables can be shown to provide the following Eqns. 3-7:

$$Z = \frac{-ms^2 Y}{ms^2 + (b_e + b_m)s + k} \quad \text{[Eqn. 3]}$$

Let:
$$b_e = 2m\xi_e \omega_n$$
$$b_m = 2m\xi_m \omega_n \quad \text{[Eqns. 4]}$$

where $\omega_n^2 = k/m$
Thus, $$|\dot{Z}| = \frac{-j\omega\left(\frac{\omega}{\omega_n^2}\right)}{2(\xi_e + \xi_n)\frac{j\omega}{\omega_n} + 1 - \left(\frac{\omega}{\omega_n}\right)^2} |Y| \quad \text{[Eqn. 5]}$$

$$|P| = \frac{m\xi_e \omega_n \omega^2 \left(\frac{\omega}{\omega_n}\right)^3 Y^2}{\left[\left(2(\xi_e + \xi_m)\frac{\omega}{\omega_n}\right) + \left(1 - \left(\frac{\omega}{\omega_n}\right)^2\right)\right]^2} \quad \text{[Eqn. 6]}$$

or $$|P| = \frac{m\xi_e \omega^3 Y^2}{4(\xi_e + \xi_m)^2} = \frac{m\xi_e A^2}{4\omega(\xi_e + \xi_m)^2} \quad \text{[Eqn. 7]}$$

where $A = \omega^2 Y$.

This is a non-linear problem and, because of the nonlinear nature of the reaction force from the coil current, the system resonance may be optimized with reference to Eqn. 7 for a given application. In general, a higher electrical damping $b_e$ may improve power output performance at frequencies below the mechanical resonant frequency $f_r = 2\Pi\omega_n$ of the system.

Figure 2:
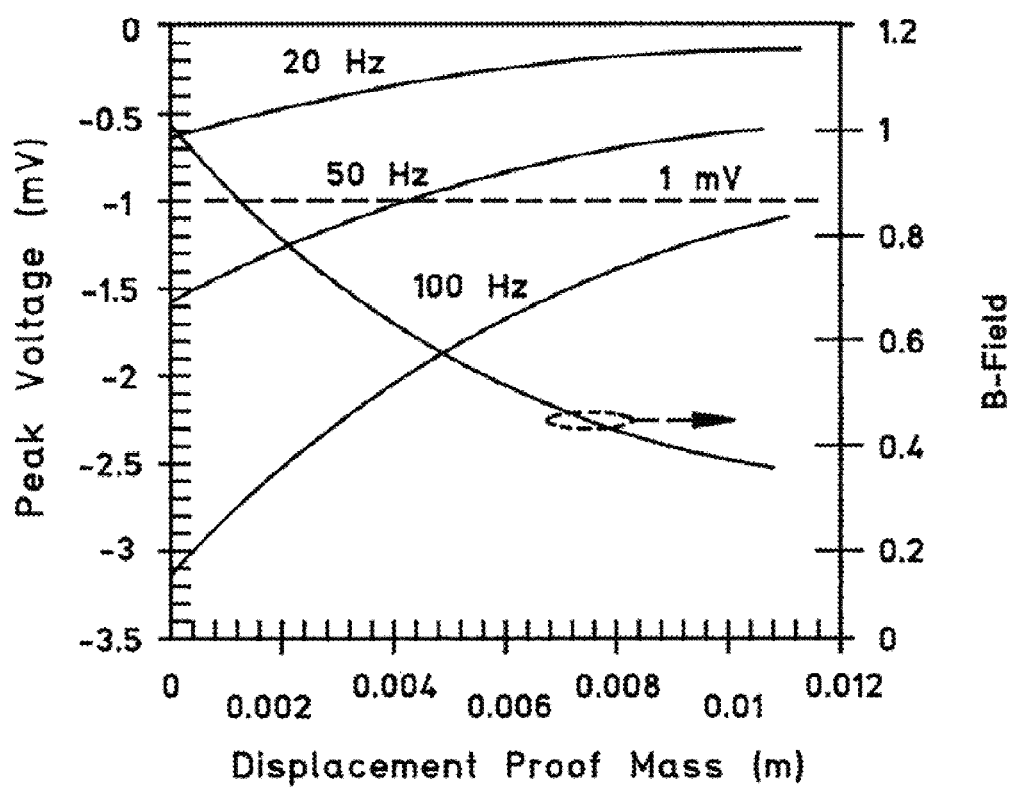
FIG. 2 is a chart illustrating the theoretical relationship between coil voltage, flux density and relative displacement according to classical electromagnetic theory for the model of FIG. 1.

FIG. 2 is a chart illustrating the expected coil voltage, flux density and relative displacement for various electrical and mechanical assumptions. The acceleration is assumed to be a constant 1.0 m/sec² over the entire frequency range, $B_{max}=1$ Tesla, k=1 N/m, velocity=50 mm/sec, mass=1 mg, and x=1 mm. The peak coil voltage shown in FIG. 2 refers to the voltage per coil winding.

Figure 3:
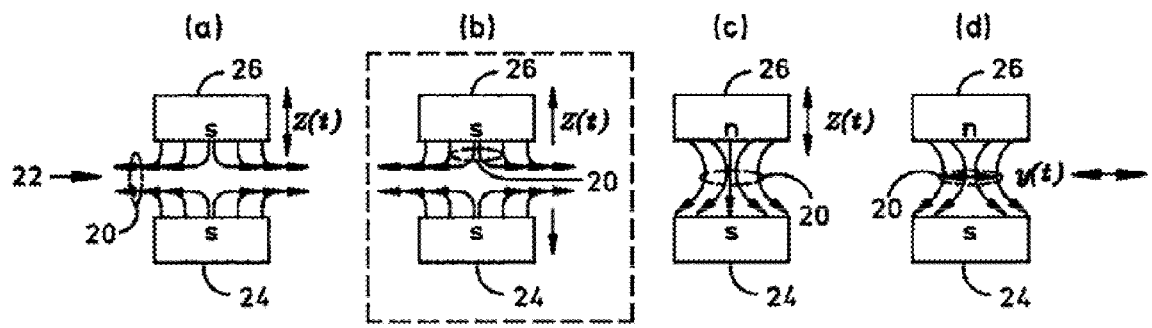
FIGS. 3a-3d illustrate an edge view of several different coil/flux configurations in accordance with various exemplary embodiments of the geophone of the present invention.

FIGS. 3a-3d show an illustrative edge view of several different coil/flux configurations. In FIG. 3, coil 20 is disposed at flux gap 22 formed by the two magnetic masses 24 and 26. In FIGS. 3a and 3b, a "steep" flux gradient region is formed in flux gap 22 by virtue of the similar magnetic poles facing or aligned with each other on each edge of flux gap 22. In FIGS. 3c and 3d, a "shallow" flux gradient region is formed in flux gap 22 by virtue of the dissimilar magnetic poles on each edge of flux gap 22. In FIG. 3a, coil 20 is disposed in flux gap 22 such that any vertical motion Z(t) of mass 26 with respect to mass 24 and coil 20 produces a rapid change in magnetic flux at coil 20. Similarly, in FIG. 3(b) coil 20 is disposed in flux gap 22 such that any synchronous vertical motion Z(t) of both masses 24 and 26 together with respect to coil 20 produces a rapid change in magnetic flux at coil 20. In contrast, in FIG. 3c coil 20 is disposed in flux gap 22 such that any vertical motion Z(t) of mass 26 with respect to mass 24 and coil 20 produces a limited change in magnetic flux at coil 20. Similarly, in FIG. 3d coil 20 is disposed in flux gap 22 such that any synchronous horizontal motion Y(t) of both masses 24 and 26 together with respect to coil 20 produces a limited change in magnetic flux at coil 20. Moreover, additional magnetic masses may also be added to any of the configurations shown in FIGS. 3a-3d and the depicted masses reorganized to form other useful geometric configurations as alternative embodiments of the geophone of the present invention.

For example, in some embodiments six or more magnetic masses may be used to further increase the magnetic field gradient. Groups of the magnetic masses may be configured to detect movement in substantially perpendicular directions. For example, two (or more) of the magnetic masses may be configured to detect movement along the X axis, two (or more) other masses may be configured to detect movement along the Y axis and two (or more) other masses may be configured to detect movement along the Z axis. More than six magnetic masses may be used in other embodiments. Each group of two or more magnetic masses may be arranged so that similar magnetic poles are aligned or facing each other. The magnetic masses may be positioned in any suitable geometric configuration.

Figure 4A:
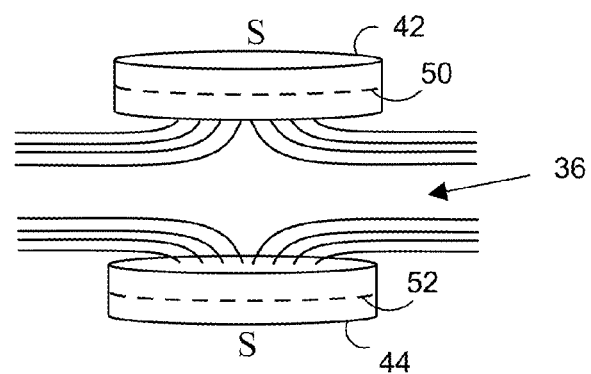
FIG. 4a illustrates the flux gap created between and surrounding two magnetic masses.

FIG. 4a is an exemplary illustration of flux gap 36 created between and surrounding magnetic masses 42 and 44. Flux gap 36 may be created when magnetic inner surfaces of masses 42 and 44 have the same polarity. Flux gap 36 may be the region between and surrounding the physical midpoint 50 of magnetic mass 42 and physical midpoint 52 of magnetic mass 44.

Figure 4B:
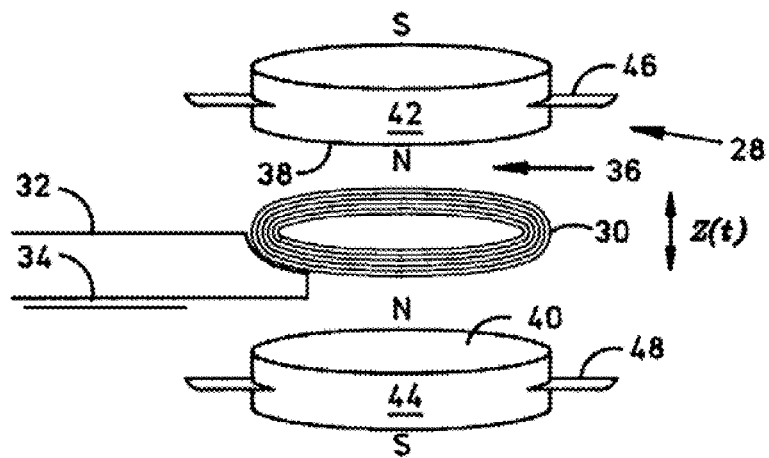
FIGS. 4b-4h illustrate an edge perspective of various exemplary embodiments of the geophone of the present invention.

FIG. 4b is a diagram illustrating an edge perspective of an exemplary embodiment of the geophone of the present invention. Geophone 28 includes coil 30 consisting of a plurality of turns of electrically-conductive material coupled to coil terminals 32 and 34. Coil 30 may be coupled to a substrate material (not shown) and/or one or more compliant elements 46 and 48 (e.g., springs). Coil 30 is disposed in the flux gap 36 bounded by the inner surfaces 38 and 40 of the magnetic masses 42 and 44, respectively. The flux gap 36 may be the region between and surrounding the physical midpoint of magnetic mass 42 to the physical midpoint of magnetic mass 44, as shown in FIG. 4a. In other embodiments, coil 30 may be dispersed in close proximity to the flux gap or surrounding magnetic masses 42 and 44. Inner surfaces 38 and 40 are shown as the N-poles of magnetic masses 42 and 44 but may be either polarity provided that both inner surfaces 38 and 40 have the same magnetic polarity.

Magnetic mass 42 may be supported by one or more compliant elements (e.g., springs) exemplified by compliant element 46. Similarly, magnetic mass 44 may be supported by one or more compliant elements exemplified by compliant element 48. The free ends of compliant elements 46 and 48 may be fixed to the substrate material (not shown) in any useful manner, thereby allowing magnetic masses 42 and 44 to move in the Z(t) direction with respect to coil 30 in response to seismic vibration or external mechanical vibration. Magnetic masses 42 and 44 may be rigidly coupled to one another and disposed to move synchronously in response to seismic vibration or external mechanical vibration. Additional magnetic masses may also be included in geophone 28 that are configured to move in the Y(t) direction and in the X(t) direction with respect to coil 30. Although one coil 30 is shown in FIG. 4a for the sake of simplicity, other embodiments as shown in FIG. 4g may include plurality of coils 30 connected either in series or parallel.

Figure 4C:
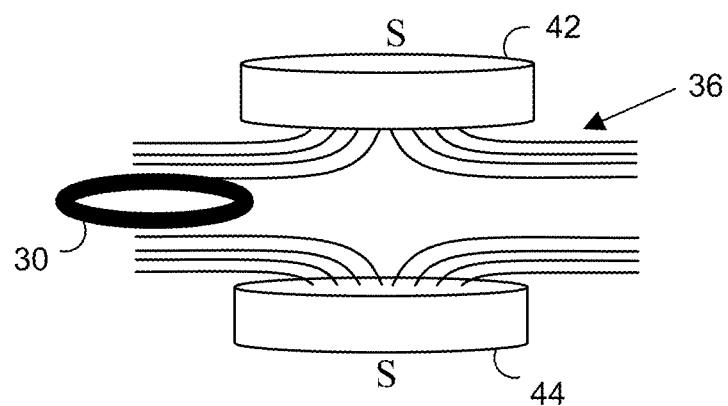
Figure 4D:
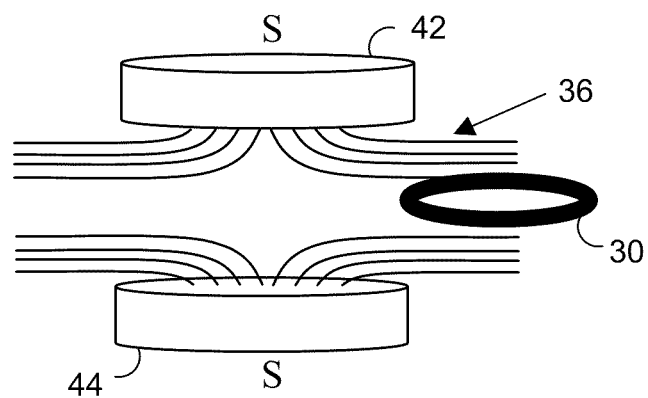
Figure 4E:
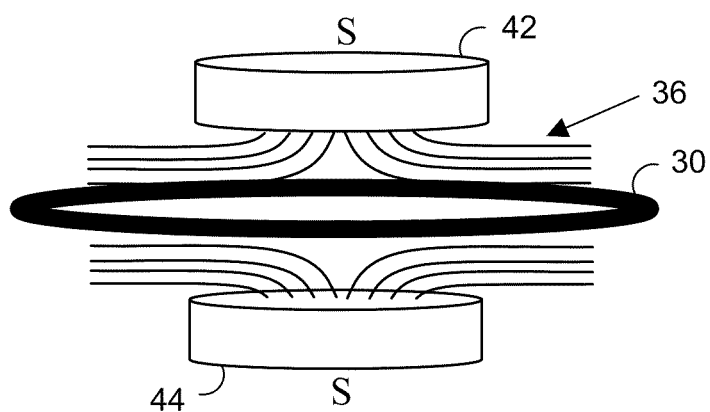

FIGS. 4c, 4d and 4e illustrate an edge perspective of alternative embodiments of geophone 28 of the present invention. As shown in FIGS. 4c and 4d, coil 30 may be disposed in the flux gap 36 outside of magnetic masses 42 and 44. Alternatively, as shown in FIG. 4e, coil 30 may be placed in flux gap 36 surrounding magnetic masses 42 and 44.

The compressed magnetic field gradient created by facing two (or more) like magnetic poles together as shown FIGS. 4a-4e allows for a greater voltage signal to be generated between terminals 32 and 34 (FIG. 4b) for a given vibration amount because coil 30 may experience a greater change in magnetic flux over a smaller distance. The exemplary configurations shown in FIGS. 4b-4e may result in a greater voltage signal without increasing the noise or geophone size, thus advantageously resulting in a greater signal-to-noise ratio than in a conventional geophone configuration.

Figure 4F:
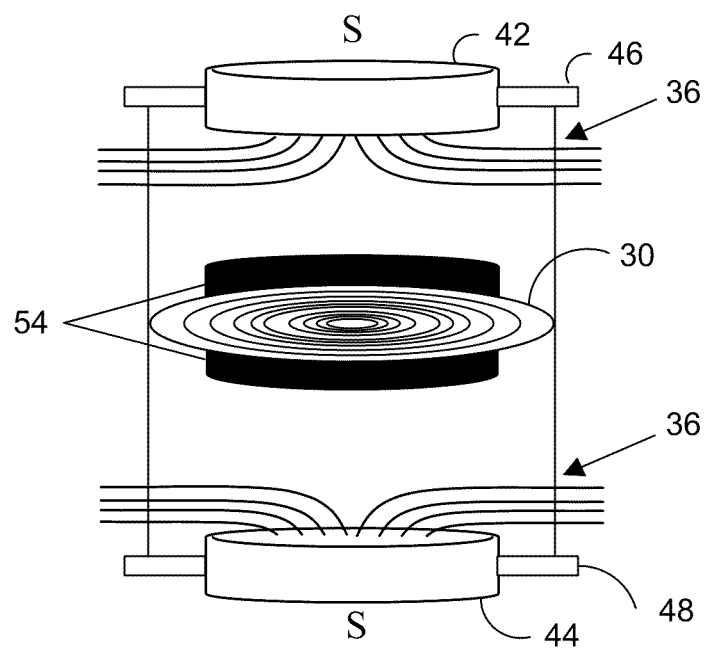
Figure 4G:
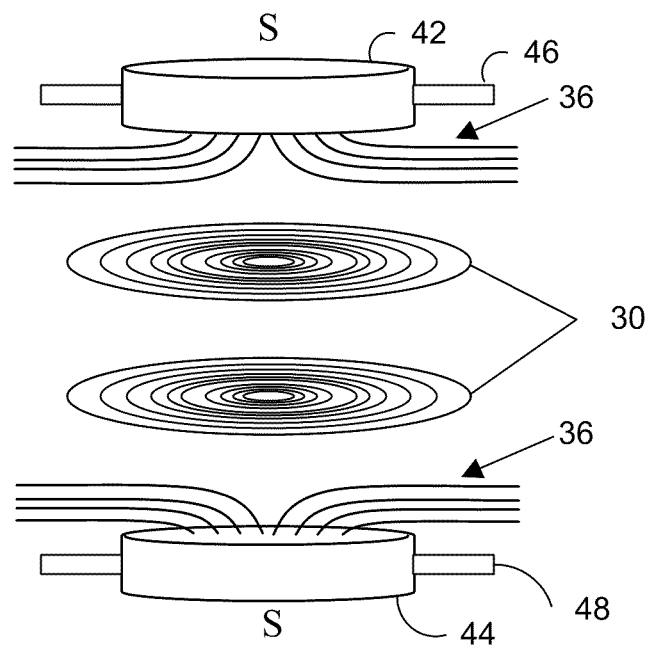

FIG. 4f illustrates an exemplary embodiment of geophone 28 in which coil 30 is connected to compliant regions 46 and 48. Additionally, as shown in FIG. 4f, in some embodiments, inertial mass 54 may be attached to outer edges of coil 30 to provide a mechanical damping force.

Figure 4H:
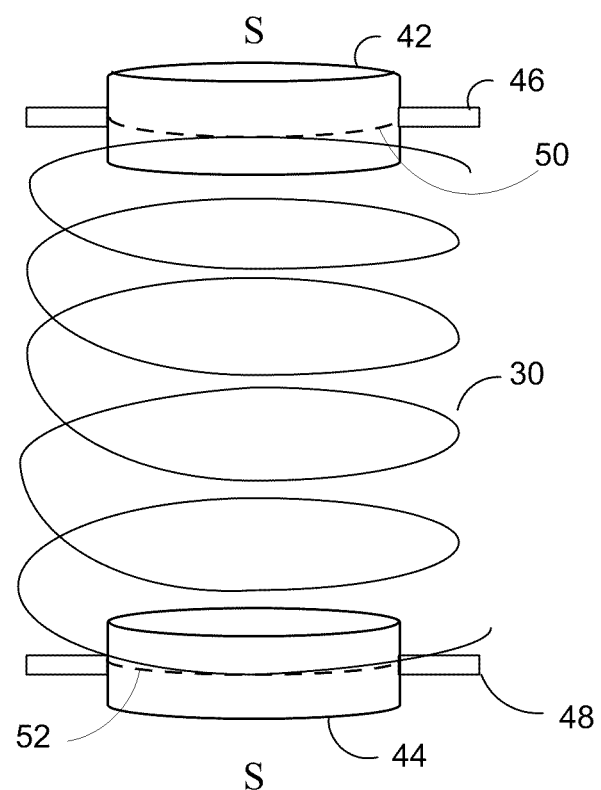

Although the embodiments shown in FIGS. 4b-4g show coil 30 disposed within the flux gap between magnetic masses 42 and 44, coil 30 may also be disposed surrounding magnetic masses 42 and 44. As shown in FIG. 4h, coil 30 may be extended around the outside of magnetic masses 42 and 44 and up to the physical midpoints 50 and 52 of magnetic masses 42 and 44.

Figure 5:
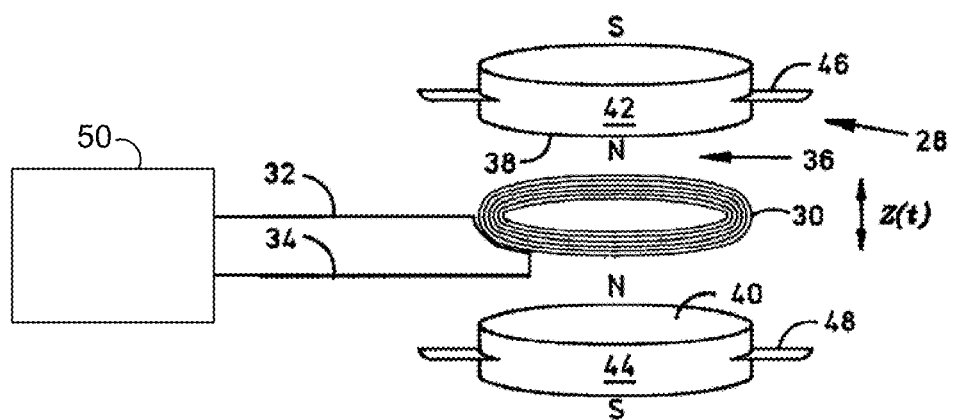
FIG. 5 illustrates an exemplary system utilizing an exemplary embodiment of the geophone of the present invention.

FIG. 5 illustrates an exemplary system utilizing an exemplary embodiment of the geophone of the present invention. As shown in FIG. 5, geophone 28 may be utilized as a vibration measuring apparatus operably connected to output device 50. Terminals 32 and 34 of coil 30 of vibration measuring apparatus 28 may be operably connected to output device 50. Output device 50 may include a display unit (not shown) and/or a speaker unit (not shown) to provide a visual and/or audible indication of the vibrations measured by vibration measuring apparatus 28. For example, in some embodiments output device 50 takes the form of a voltmeter or other device capable of detecting or measuring the potential difference across terminals 32 and 34 of coil 30. Output device 50 may also include memory (e.g., RAM, ROM, and hybrid types of memory) and storage (e.g., optical, tape, or hard disk drives) coupled to processing circuitry (not shown), as well as at least one analog-to digital converter (ADC) for converting the received voltage signal to a digital signal for processing.

In some embodiments, output device 50 may include a computer and/or seismic imaging equipment. The computer or seismic imaging equipment may be configured to record a log of recorded vibration measurements performed continuously, periodically, or on a user-defined schedule. The log may then be saved to volatile or non-volatile memory or recorded to a local or network storage device (not shown). Output device 50 may also include an integrated network controller (e.g., wireless network controller) for saving vibration measurements to a remote storage device or network, such as the Internet or a secured virtual private network (VPN) or intranet. The system of FIG. 5 may be implemented in various applications, such as machine monitoring, seismic imaging, etc.

The above described embodiments of the present invention are presented for purposes of illustration and not of limitation, and the present invention is limited only by the claims which follow.

What is claimed is:

1. A method for measuring vibrations comprising:
disposing one or more coils within a flux gap created between a plurality of ferromagnetic masses, wherein at least two of the plurality of ferromagnetic masses have an inner magnetic pole separated from one another by the flux gap, and wherein the magnetic polarity of each inner magnetic pole is similar to the magnetic polarity of the inner magnetic pole on the opposite side of the flux gap;
measuring voltage generated on the one or more coils in response to changing magnetic flux arising from motion of at least one of the ferromagnetic masses; and
generating an indication of vibrations based at least in part on the measured voltage, wherein disposing the one or more coils comprises disposing the one or more coils within the flux gap between the at least two ferromagnetic masses and wherein a portion of the one or more coils are within a region bounded between inner surfaces of the at least two ferromagnetic masses.

2. The method of claim 1, wherein disposing the one or more coils comprises disposing the one or more coils within the flux gap outside of the at least two ferromagnetic masses.

3. The method of claim 1, wherein disposing the one or more coils comprises disposing the one or more coils within the flux gap surrounding the at least two ferromagnetic masses.

4. The method of claim 1, wherein the one or more coils are connected to one or more integral compliant regions.

5. The method of claim 1, wherein the at least two ferromagnetic masses are rigidly coupled to one another and disposed to move synchronously.

6. The method of claim 1, wherein:
the one or more coils comprise a plurality of coils, and
the plurality of coils are connected in series or parallel.

7. The method of claim 1, wherein the plurality of ferromagnetic masses comprises six ferromagnetic masses, wherein two ferromagnetic masses are configured to detect movement in a first direction, two ferromagnetic masses are configured to detect movement in a second direction substantially perpendicular to the first direction and two ferromagnetic masses are configured to detect movement in a third direction substantially perpendicular to the first direction and the second direction.

8. The method of claim 1, wherein generating the indication of vibrations comprises outputting the indication.

9. The method of claim 1, further comprising recording the indication to a log.

10. The method of claim 9, wherein recording the indication comprises recording the indication on a user-defined schedule.

11. The method of claim 1, wherein disposing the one or more coils comprises disposing the one or more coils centered at a midpoint of the inner surface of the at least two ferromagnetic masses.

\* \* \* \* \*